Figure 1:
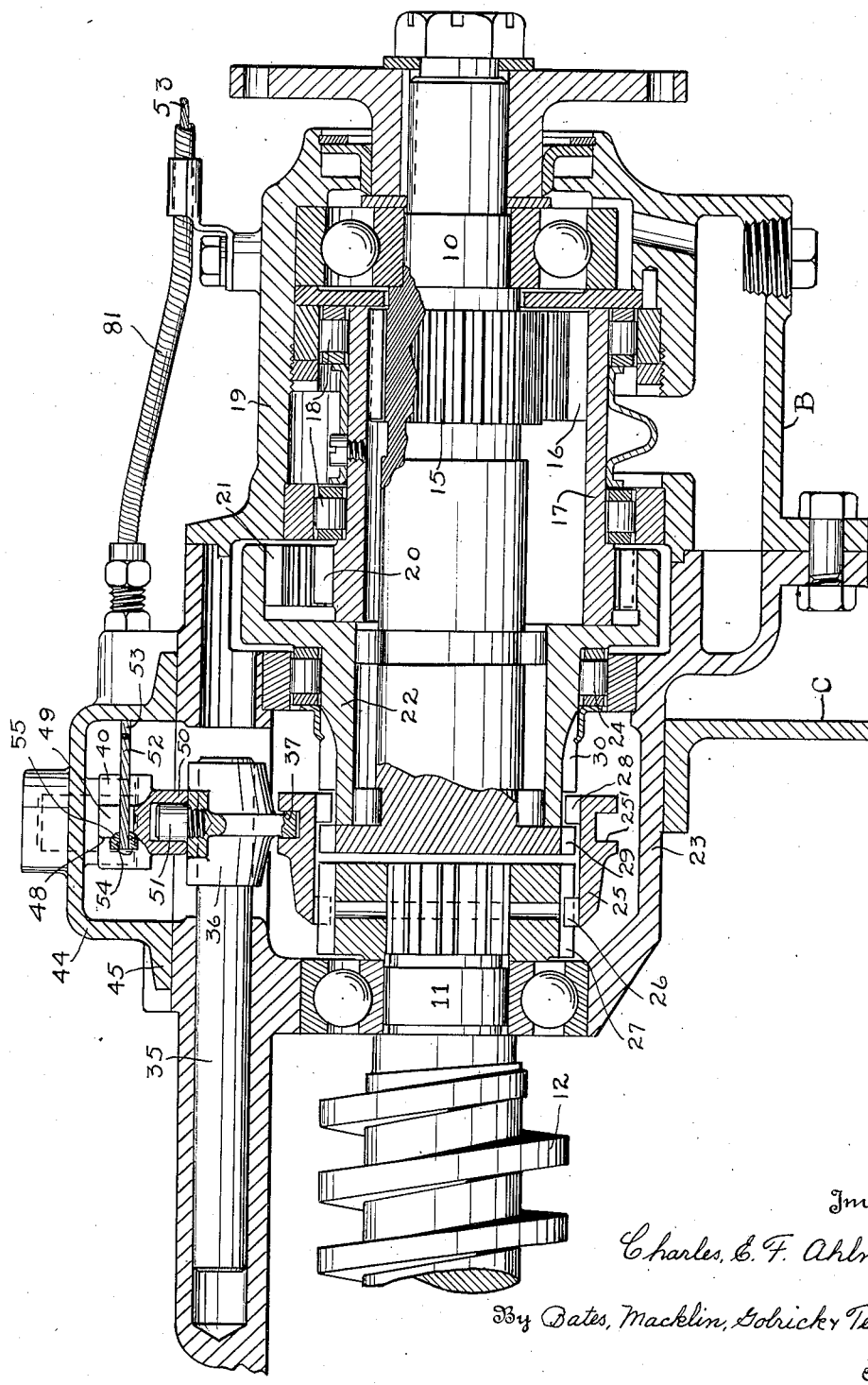

Jan 6, 1931.  C. E. F. AHLM  1,787,968
TRANSMISSION CONTROL MECHANISM
Filed April 8, 1927  3 Sheets-Sheet 2
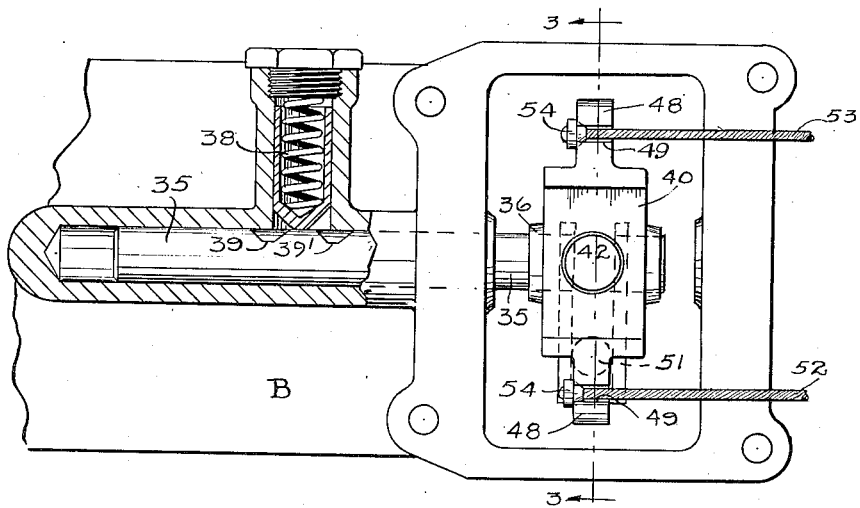
FIG.-2
FIG.-2-A
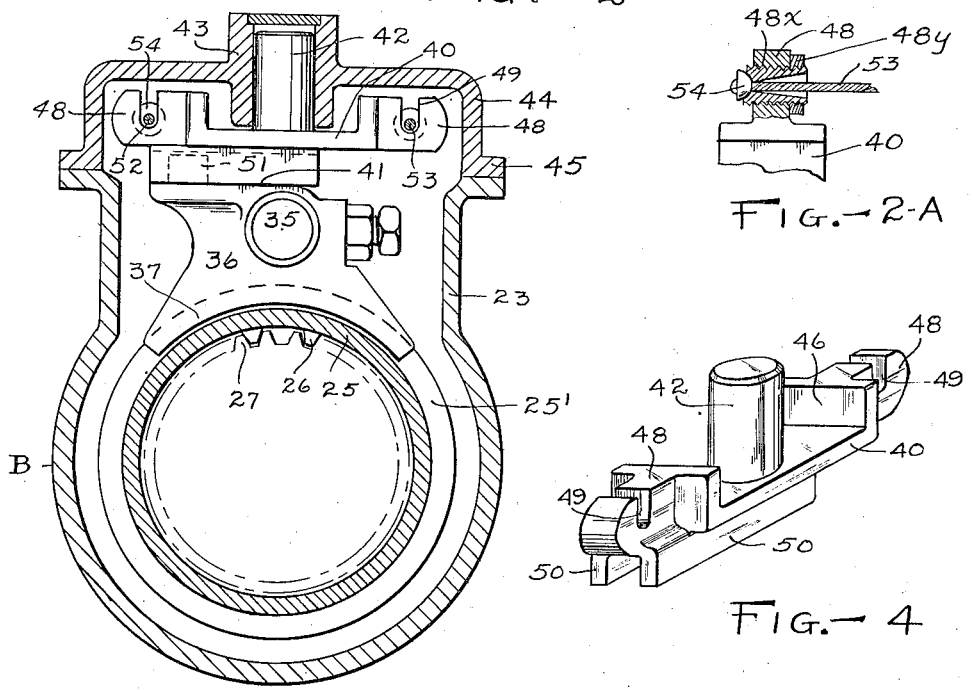
FIG.-3
FIG.-4
Inventor
Charles E. F. Ahlm
By Bates, Macklin, Golrick & Teare
Attorneys

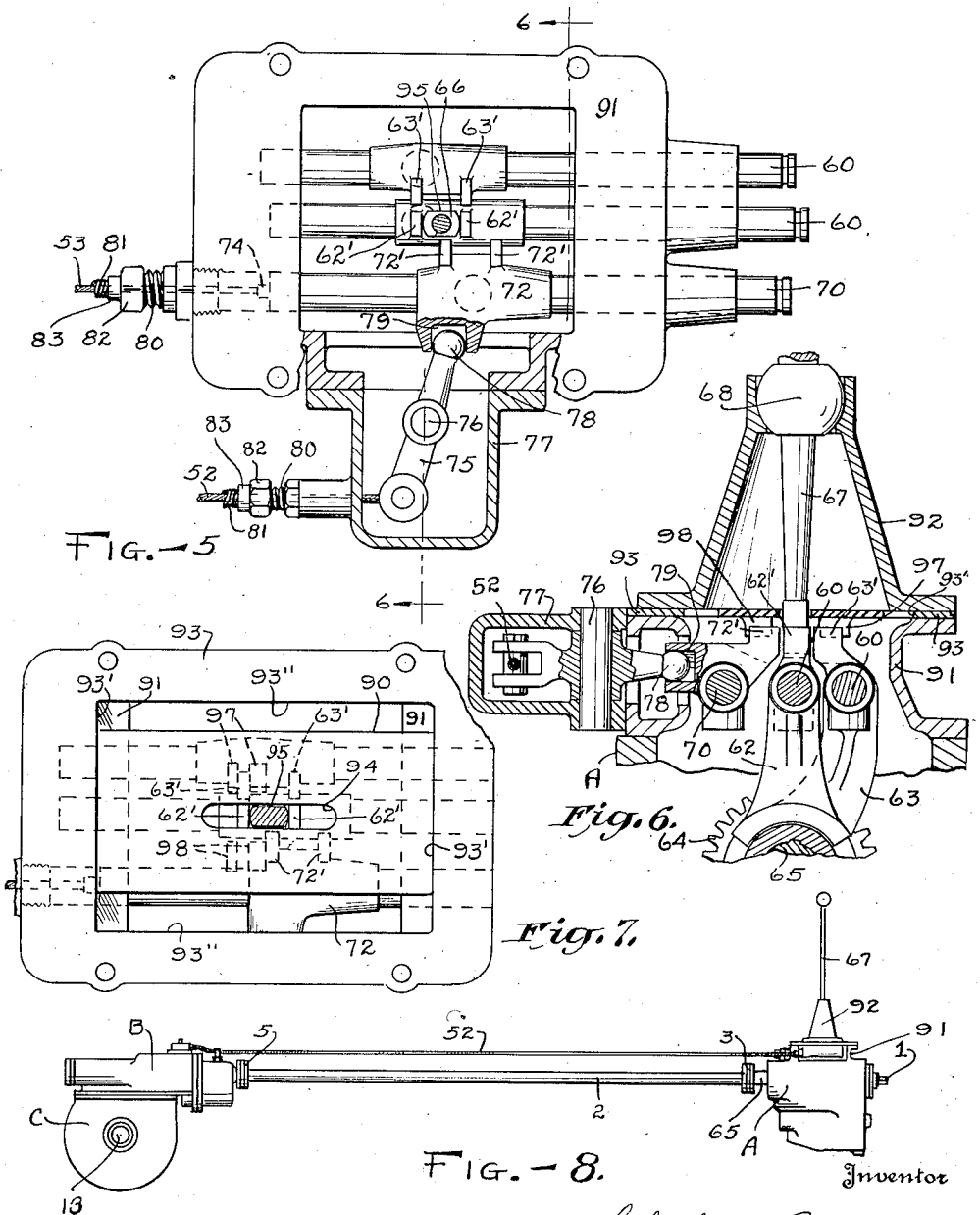

Patented Jan. 6, 1931

1,787,968

UNITED STATES PATENT OFFICE

CHARLES E. F. AHLM, OF CLEVELAND, OHIO, ASSIGNOR TO AUTOMOTIVE PATENT HOLD-
ING COMPANY, OF CLEVELAND, OHIO, A CORPORATION OF DELAWARE

TRANSMISSION-CONTROL MECHANISM

Application filed April 8, 1927. Serial No. 181,926.

This invention relates to automobile change speed transmission control, particularly to a mechanism for controlling two change speed transmission units operating in tandem, that is to say, operating at separated points in a common power line. The mechanism as shown is arranged to establish an operating connection between the usual multiple speed change gear unit and an auxiliary single speed change unit, although of course its use need not be confined to precisely this arrangement.

The primary object is to provide a simple convenient mechanism which will be of light weight and which will at the same time have the necessary strength and durability to withstand continued use on a mechanism such as a motor vehicle.

A specific object is to provide a simple operating connection between a movable control member, such as a lever, and a remotely positioned element such as a clutch, which element is adapted to be shifted into two definite positions.

The mechanism shown comprises briefly, a slidable bar carried in a main transmission box of a motored vehicle parallel to the usual slide bars which are for controlling the position of the gears in such gear box, a single speed change gearing interposed in the power line between the propeller shaft and rear axle and having a dental clutch sleeve arranged to be shifted forwardly and rearwardly, and a flexible operating connection between the slide bar and the clutch sleeve of the auxiliary transmission. The flexible members operate only in tension and are so arranged that when the slide bar is shoved rearwardly the flexible connection acts to pull the sleeve forwardly and, when shoved forwardly, to pull the sleeve rearwardly.

In the drawings Fig. 1 is an embodiment of an auxiliary gearing adapted to transmit power at two speeds, namely, direct drive and one reduced speed; Fig. 2 is a plan view of the operating parts at one end of the control mechanism; Fig. 2—A is a detail cross-sectional view showing a modification, namely, an adjusting device for the cables; Fig. 3 is a cross sectional view as indicated by the line 3—3 in Fig. 2; Fig. 4 is a perspective view of one of the parts of the control mechanism; Fig. 5 is a plan view of the upper portion of a regular gear box for slidable gears and showing the regular slide bars with relation to the special slide bar forming a part of the present control mechanism; Fig. 6 is a transverse section through the upper portion of such main gear box, the section being taken generally along the line 6—6 on Fig. 5. Fig. 7 is a plan view illustrating a shifting bar locking device; and Fig. 8 is an assembly view showing a main gear box and its relation to an auxiliary transmission mounted adjacent the rear axle of the vehicle.

Referring in detail to the drawings, A in Fig. 8 represents a conventional gear box having the usual arrangement for selectively transmitting power directly or at one or more reduced speeds including reverse from the engine or clutch shaft, designated 1, to the propeller shaft 2. The propeller shaft may have the usual universal joints 3 and 5 at its ends. B represents the auxiliary transmission gear box secured to the rear axle and differential housing, C, the propeller shaft being connected, by one of the universal joints, to the driving shaft of the auxiliary transmission.

As shown in Fig. 1, the driving shaft of the auxiliary transmission is indicated at 10 the driven shaft 11 of the transmission having a worm 12 for engagement with a worm gear on the usual differential gearing (not shown) which drives the axle 13 (see Fig. 8). The auxiliary gearing shown is very similar to one disclosed in my prior application, Serial No. 756,746 filed December 18, 1924, which matured into patent numbered 1,758,386, and more nearly in accordance with my later co-pending application Serial No. 69,762 filed November 18, 1925.

Such a gearing comprises a driving gear shown as a small external pinion 15 mounted on the shaft 10 and in permanent mesh with an internal gear 16 on a sleeve gear 17 supported in rolling bearings 18 eccentrically mounted in a housing section 19. The sleeve gear 17 has external teeth 20 engaging internal teeth 21 on another sleeve gear member 22 concentric with the shaft 10 and supported in the housing section 23 on a bearing 24. The shaft 10 is arranged to drive the worm carrying shaft directly, as well as through the gears, by reason of a dental clutch arrangement shown as comprising a sleeve 25 internally toothed at each end, the internal teeth 26 at the rear end permanently engaging corresponding external teeth 27 rigid with the shaft 11, the forward teeth 28 selectively engaging external teeth 29 rigid with the shaft 10 and external teeth 30 rigid with the member 22. In operation when the sleeve 25 is in its rearmost position direct drive is established between the shafts 10 and 11, and when in its forward position reduced drive is transmitted from the shaft 10 to the shaft 11 through the gears 15, 16, 20 and 21. The above described gear arrangement is given merely as an example of a single speed change gearing controllable by an element which is movable to two positions.

For shifting the dental clutch element 25 I have shown a bar 35 slidable in a longitudinal recess in the housing section 23 and carrying at its forward end a shipper fork 36 having the usual arms 37 on its lower side engaging the groove 25' in the sleeve 25. Suitable means, such as a spring pressed plunger 38, may engage notches 39 and 39' in the side of the bar to hold the sleeve in its two-operating positions. The position of the clutch sleeve herein shown is abnormal and taken merely for convenience of illustration.

For controlling the position of the bar 35 I have shown a member 40 bearing, at its lower side, upon a flattened portion 41 of the member 36 and pivoted intermediately of its ends by reason of an upstanding stud 42 seated in a recessed boss 43 of a cap 44. The cap forms a separable part of the housing section 23, and may be secured to this section by flanges 45. The member 40, as best shown in Fig. 4, has upwardly extending arms 46 one at each side of the hollow boss 43 and the arms carry oppositely extending ears 48, each ear being slotted as at 49 to receive the ends of flexible cables. There is a permanent connection between the member 40 and the fork 36, at one side only of the pivot, comprising a slot formed by two depending parallel ribs 50 on the member 40 and a pin 51 rigid with the fork and slidably engaging the slot. The flexible members preferably comprise tightly twisted or braided multiple strand wire cables, an example being "Bowden" wire, this being chosen for lightness, flexibility and strength. The rear ends of the cables 52 and 53 are embraced by ferrules, such as shown at 54, having conical forward ends engaging conical surfaces 55 in the ears 48, the cables passing loosely through the slots to allow for the relative swinging movement between the cables and the member 40, without sharply bending the cables. It will be seen that as the cable 52 is pulled forwardly the clutch sleeve 25 will also be pulled forwardly because the pin 51 is confined between the ribs 50 and obviously when the cable 53 is pulled forwardly the sleeve 25 will be thrust rearwardly.

In Fig. 6 I have shown the upper portions of the main gear box A in section to show the positions of a pair of regular slide bars 60 with relation to the slide bar 70 which controls, through the cables, the positioning of the sleeve clutch 25. Each member 60, as shown in Fig. 6, has a shipper fork rigid therewith, such as 62 and 63 for engagement with slidable gears, one gear being shown at 64. The gear shown is splined onto the driven shaft 65 of the main transmission. On their upper faces the forks have pairs of lugs, such as 62' and 63' engageable by the lower rounded end 66 of a manually operable shifting lever 67 of the usual form pivotally supported as at 68 above the bars. As shown in Fig. 5, the lever is in position between the lugs 62', from which position it may move between the lugs 63' to shift into low or reverse. It may be assumed that with the bars 60 in the relation shown, the gears are in neutral and that, by shifting the fork 62 forwardly from the position shown, direct drive is established. Since this is a very common type of control, illustration of the actual gear relations is believed to be unnecessary.

When such direct connection is established between the driving and driven shafts of the main transmission, the lugs 62' align with lugs 72' on the bar 70, and the lever may engage these latter lugs to shift the bar 70 when the lower end of the lever is swung to the left (Fig. 6). The forward end of the cable 53 may be connected by any suitable means as at 74 directly to the rear end of the bar 70, while the cable 52 connects with the bar indirectly through a lever 75 carried on a vertical pin 76 supported in the hollow bracket 77. The cable 52 has a swivel connection with the outer end of the lever, and the inner end of the lever has a ball end 78 engaging in a cylindrical socket 79 in the side of the member 72. This ball and socket connection between the members 72 and 75 provides for holding the lugs 72 in the proper position to be engaged by the lever 67, while permitting relative movement of the bar and lever without binding.

When the lever has been manipulated to establish the direct drive connections in the main transmission, as mentioned, and with the bar 70 still in the position shown all the shafts in the main power line, from 1 to the shaft herein designated 11 (the worm shaft), turn at the same speed. The driver may now pick up the bar 70 and move it rearwardly to throw the auxiliary transmission into operation through the gears 15, 16, etc. for a speed intermediate high and 2nd. Obviously the gear relations in the auxiliary transmission might provide for an overdrive instead of an under-drive and in such case, the last operation mentioned would throw the car into top speed. The ends of the cables lead into the respective housings through hollow removable sleeves 80. These sleeves are adapted for supporting the respective ends of cable protecting tubes 81 secured to the sleeves 80 by suitable means such as nuts 82 and ferrules 83, similar to the usual gasoline line nipple and nut connections. Preferably the tubes 81 are made from tightly coiled wire, in order that they will allow considerable flexing and even stretching, as the cables themselves have enough elasticity to enable them to give under unusual strain, thus preventing breakage of the more rigid parts. This is incidentally an advantage over a connection which comprises members heavy enough to both push and pull.

It will be seen that because the original setting of the member 72 and its lugs 72′, it is impossible to operate the auxiliary gearing to change from one speed to another thereby except when the multiple speed transmission is conditioned for affording its highest speed, namely direct-drive. The advantage of this is that, at this time, the load on the propeller shaft is least, i. e., the engine operates at the greatest disadvantage. It follows that because of this, the auxiliary gearing arrangement may be made very light in construction whereas if it were possible to operate the gears thereof when, for example, the main transmission is operating in low or reverse, the auxiliary gearing would have to be made exceedingly strong and therefore much heavier to stand the strain.

In the event of permanent stretching of the cables after considerable use, or to facilitate initial assembly, I may provide endwise adjustment for the cables to either lengthen or shorten them by means such as shown in Fig. 2—A. This figure shows an externally threaded sleeve 48X adapted to engage one of the ears 48. Such sleeves would serve in place of the slots 49 to support the ferrules 54. The sleeve as shown has a conical opening to allow lateral movement of the cable and may be locked in adjusted position by a lock nut 48y.

Each of the slide bars 60 and 70 may have resilient detent means (not shown) such as the plunger 38 illustrated in Fig. 2 for the clutch shift bar. As a means for positively locking all of the bars except that particular one which is engaged by the shift lever end 67 at a given time, I utilize the device shown in Figs. 6 and 7. This device is somewhat similar to that shown, described and claimed in my copending application, Serial No. 153,545 filed December 9, 1926, and consists of a plate 90 mounted between housing sections 91 and 92 surmounting the main multiple speed transmission housing A. This plate 90 is guided for limited movement transversely of the shift bars by a cut out filler plate 93 in the nature of a shim separating the sections 91 and 92. The inner edges 93′ serve as guides for the plate 90 and the edges 93″ as stops. The plate 90 has a slot 94 for engaging the flattened sides 95 of the lower end of the shift lever, this slot allowing fore and aft movement of the lever to pick up the lugs 62′, 63′ and 72′. Depending from the lower surface of the plate 90 are paired lugs 97 and 98. The lugs 97 coact with the shipper fork lugs 62′ and 63′ and bridge across these two sets of shipper fork lugs whenever the lever 66 is in engagement with the lugs 72′. When the lever is in engagement with the lugs 62′, as shown in Figs. 6 and 7, the lugs 97 on the plate straddle the rearmost lug 63′ while the foremost lug 98 rests against the rearmost lug 72′. The bar 70 is therefore locked against rearward movement or in other words completely locked as it cannot move any further forwardly because with 70 in the position shown, the member 36 (Fig. 1) will have reached the limit of its rearward travel. The bar 60 is locked against movement in either direction. When the shift lever moves into engagement with the lugs 63′ the plate is of course carried to the right from the position shown in Fig. 6 and the lugs 98 remain in engagement with the rearmost lug of the fork 72, but straddle the rearmost lug 62′ of the fork 62. Thus, no matter which pair of lugs whether 62′, 63′ or 72′ are engaged by the lever, the downwardly extending lugs on the plate 90 prevent any further movement of the other two bars.

From the above it will be seen that I have provided a comparatively simple arrangement particularly useful for controlling one speed change unit from the operating mechanism of another, without having to radically modify existing practice and design of such mechanism. Further, the connecting members between the two gear housings are very light, since they have only to serve as tension members, and there is no loose play in the connections because in a given operation the stressed cable acts to take up the slack in the then idle cable. Also the connections offer practically no resistance to the free floating movement of the axle, both by reason of lightness and flexibility and because the connections may be made at the forward end so close to the pivotal center about which the axle moves, namely the front universal joint.

I claim:

1. Control mechanism for a change speed transmission having an element shiftable in opposite directions to change from one speed to another, two substantially parallel tension members, one being connected with said element to move it in one direction when pulled in a given direction, the other being connected to said element to move it in the opposite direction when pulled in said given direction, a slide bar with connections to both tension members whereby, when the bar is shifted in one direction, one tension member is pulled and, when shifted in the other direction, the other tension member is pulled, and means to engage and shift the bar in opposite directions.

2. Control mechanism for a change speed transmission having an element shiftable in opposite directions to change from one speed to another, comprising a reciprocable member connected with said element, a pivoted member and means connecting the pivoted member to the reciprocable member, a pair of flexible members each having a connection with the pivoted member one at each side of the pivot axis, and a manually operated member for exerting pulling force first on one flexible member and then on the other to effect the speed change.

3. Control mechanism for a change speed transmission having an element shiftable in opposite directions to change from one speed to another, comprising a pair of flexible members each having a connection with said element to be shifted, means including said connections whereby a pull on one of the flexible members shifts the element in one direction and a pull on the other flexible member shifts the element in the opposite direction, a shiftable bar positioned remote from said transmission and having connections with each of said flexible members so arranged that movement of the bar in one direction pulls on one of the flexible members and movement of the bar in the other direction pulls on the other flexible member, and a manual control member for shifting the bar.

4. Control mechanism for a change speed transmission having an element to be shifted in opposite directions to change from one speed to another, a reciprocable member having a permanent connection with said element to be shifted, and a pair of cables one attached to the member to move it in one direction when pulled in a given direction and the other attached to said member to move it in the other direction when pulled in said given direction, and manual control means having connections with the cables whereby said means may pull first on one cable and then on the other.

5. Control mechanism for an auxiliary change speed transmission having a housing and an element shiftable in opposite directions to change from one speed to another, said mechanism comprising a slidable bar connected with said element and a member pivoted to the transmission housing, one end of said pivoted member having an operating connection with said bar to move it, and means to alternately rotate the pivoted member about its pivot in opposite directions, said means comprising flexible members each connected at one end with the pivoted member, and a manual control device to exert pulling force on the other ends of said flexible members selectively.

6. Control mechanism for an auxiliary change speed transmission having a housing and an element shiftable in opposite directions to change from one speed to another, comprising a movable member connected with said element and a member extending transversely of the member and pivoted to the transmission housing, said pivoted member having a pin and slot connection with said first named member, and means to alternately pull on the ends of said pivoted member, said means comprising cables and a manual control mechanism arranged to selectively pull on the cables.

7. In a change speed gearing control, an element to be shifted into two operative positions along a straight line, a transversely extending member pivoted intermediate of its own ends, one end of the pivoted member having a slot and the member to be shifted having a pin engaging the slot, two flexible members each being connected with a respective end of the pivoted member, and means remote from said element to be shifted and operable to exert a pull first on one flexible member and then on the other.

8. Control mechanism for a change speed transmission having an element movable to two different positions to change from one speed to another, comprising a movable member permanently connected with said element to move with it, a pivoted member extending transversely of the movable member, one end of the pivoted member having a pin and slot connection with said movable member, flexible means to turn said pivoted member in opposite directions and a manual control remote from said element and operating through said flexible means to turn the pivoted member in opposite directions to effect such speed change.

9. In combination, a main change speed transmission mechanism including the usual slidable dental elements and corresponding shifting bars, manual control means to selectively move said bars, an auxiliary transmission having an element to be shifted longitudinally to change from one speed to another, and flexible means operating always under tension and having connections to move the said element in opposite directions, there being a bar mounted parallel to said shifting bars and engageable by said control means, said last named bar having connections with the flexible means to cause such speed change.

10. In combination, a multiple speed gearing and an auxiliary change speed gearing in separated relation in a common power line, said multiple speed gearing having slide bars one of which operates to affect this gearing to change from one speed to another, manually operated means to selectively engage the bars and a pair of tension members connected to one of said bars, and means operated thereby to control said auxiliary gearing.

11. In combination in a motor vehicle, a main change speed transmission gearing having sliding gears and shift bars associated therewith, an auxiliary change speed transmission gearing connected therewith in tandem, a sliding bar on the auxiliary transmission connected with an element of this transmission to be shifted to change from one speed to another, a sliding bar on the main transmission mounted alongside the said shift bars, linkage comprising a pair of pivoted members respectively connected to the said sliding bars, means connecting the pivoted members to cause them to move in unison, and means adapted to engage said main transmission shift bars and arranged to engage the said sliding bar of the main transmission to control the auxiliary transmission through said linkage.

12. In a motor driven vehicle, a multiple speed transmission gearing having a plurality of slide bars at least one having connections for controlling the transmission, an auxiliary change speed transmission mounted at the driving axle, said auxiliary transmission having an element to be shifted to change from one speed to another, a pivoted lever arranged to selectively engage the bars to shift them, and tension means connecting one of the bars to the said element of the auxiliary transmission and arranged to pull the said transmission element in opposite directions as this bar is moved in corresponding directions.

13. In a motor driven vehicle, a multiple speed transmission gearing having the usual slidable dental elements and corresponding slide bars, an auxiliary change speed transmission interposed in the power line between the first transmission and the usual axle driving gearing, the said auxiliary transmission having an element to be shifted to two positions to change from one speed to another, a slide bar mounted with the aforesaid slide bars and having a flexible operating connection with said auxiliary transmission element, means to selectively engage the bars to shift one at a time, and means engaged by the last named means and positioned by such selection of one bar to lock the other bars against movement.

14. In combination in a motor driven vehicle, a multiple speed transmission disposed at the front of the vehicle behind the engine, and having the usual slidable dental elements and corresponding slide bars, an auxiliary change speed transmission interposed between the propeller shaft and rear axle and carried by the rear axle housing, said auxiliary transmission having an element to be shifted from one speed to another, a slidable bar mounted in the multiple speed transmission parallel to said slide bars, a pivoted lever adapted to selectively engage all of the bars to shift them, and flexible means connecting said slidable bar to the said element of the auxiliary transmission and arranged to pull the said transmission element in opposite directions.

15. In combination, a multiple speed transmission gear unit for a motor vehicle, said unit comprising the usual arrangement of slidable change speed elements, shifter bars therefor, and a control member to operate the shifter bars, an auxiliary change speed gear unit operatively disposed between the usual driving axle of such motor vehicle and said multiple speed transmission gear unit, a shaft connecting the multiple speed unit to the auxiliary unit to drive the latter unit, one of said shifter bars of the multiple speed unit being adapted to control the auxiliary unit to change from one speed to another, there being flexible tension members respectively connected with the last mentioned shifter bar and to the auxiliary unit to control the latter to change from one speed to another, the shifter bars being related in such manner that the operation of the auxiliary unit to change from one speed to another is prevented except when the multiple speed transmission is delivering power at its highest speed.

In testimony whereof, I hereunto affix my signature.

CHARLES E. F. AHLM.